(12) United States Patent
Kular

(10) Patent No.: US 12,379,105 B2
(45) Date of Patent: Aug. 5, 2025

(54) ENRICHED AIR STOVE

(71) Applicant: Andrew C. Kular, Wolfe Island (CA)

(72) Inventor: Andrew C. Kular, Wolfe Island (CA)

( * ) Notice: Subject to any disclaimer, the term of this patent is extended or adjusted under 35 U.S.C. 154(b) by 667 days.

(21) Appl. No.: 16/961,323

(22) PCT Filed: Jan. 11, 2019

(86) PCT No.: PCT/CA2019/050042
§ 371 (c)(1),
(2) Date: Jul. 10, 2020

(87) PCT Pub. No.: WO2019/140511
PCT Pub. Date: Jul. 25, 2019

(65) Prior Publication Data
US 2020/0363057 A1    Nov. 19, 2020

Related U.S. Application Data

(60) Provisional application No. 62/618,353, filed on Jan. 17, 2018.

(51) Int. Cl.
| | |
|---|---|
| *F23B 60/02* | (2006.01) |
| *F23B 50/00* | (2006.01) |
| *F23L 5/02* | (2006.01) |
| *F23L 7/00* | (2006.01) |
| *F23Q 7/02* | (2006.01) |
| *F23Q 13/00* | (2006.01) |
| *F24B 1/19* | (2006.01) |
| *F24B 1/193* | (2006.01) |

(52) U.S. Cl.
CPC ............... *F23B 60/02* (2013.01); *F23B 1/36* (2013.01); *F23L 5/02* (2013.01); *F23L 7/007* (2013.01); *F23Q 7/02* (2013.01); *F23Q 13/00* (2013.01); *F24B 1/19* (2013.01); *F24B 1/193* (2013.01); *F23L 2900/07005* (2013.01); *F23L 2900/07006* (2013.01)

(58) Field of Classification Search
None
See application file for complete search history.

(56) References Cited

U.S. PATENT DOCUMENTS

| | | | |
|---|---|---|---|
| 1,559,521 A | 10/1925 | Lewis | |
| 4,064,840 A * | 12/1977 | Vierling | F02B 47/06 |
| | | | 123/585 |
| 4,471,751 A | 9/1984 | Hottenroth | |
| 4,867,050 A | 9/1989 | Patenaude | |
| 4,924,847 A | 5/1990 | Patenaude | |

(Continued)

FOREIGN PATENT DOCUMENTS

| | | |
|---|---|---|
| CN | 2178848 Y | 10/1994 |
| CN | 201199039 Y * | 2/2009 |
| CN | 201368485 Y | 12/2009 |

(Continued)

*Primary Examiner* — Jason Lau

(57) ABSTRACT

An enriched air stove having a combustion surface for supporting solid fuel for combustion and an oxygen enriched air intake fluidly connected to the combustion surface to provide an oxygen enriched air source. The combustion surface can be a baseplate comprising a plurality of apertures fluidly connected to an air mixing chamber to mix atmospheric air and enriched oxygen to assist combustion of the solid fuel.

18 Claims, 11 Drawing Sheets

(56) References Cited

U.S. PATENT DOCUMENTS 5,105,797 A     4/1992   Gulutzen

FOREIGN PATENT DOCUMENTS

| CN | 201753929 U | * | 3/2011 | |
|----|-------------|---|--------|---|
| CN | 106322359 A | | 1/2017 | |
| GB | 2046415 A | * | 11/1980 | ............ F23C 10/002 |
| KR | 20120005332 A | | 1/2012 | |

* cited by examiner

ENRICHED AIR STOVE

CROSS-REFERENCE TO RELATED APPLICATION

This application claims priority to U.S. provisional patent application Ser. No. U.S. 62/618,353, filed Jan. 17, 2018, and is a United States National Stage application under 35 U.S.C. 371 of PCT Application No. PCT/CA2019/050042, filed on 11 Jan. 2019, both of which are incorporated by reference herein in their entirety.

FIELD OF THE INVENTION

The present invention pertains to an enriched air stove. In particular, the enriched air stove uses an oxygen-enriched air source in combination with an atmospheric air source as the combustion air.

BACKGROUND

A wood-burning stove is a heating and/or cooking appliance capable of burning wood fuel and wood-derived biomass fuel. Historically, wood-burning stoves were made of a solid metal closed fire chamber, a fire brick base and an adjustable air control. Of the first 100 letters patent issued by the United States Patent Office in the year 1836, U.S. Pat. No. 0,000,037 (Crane Stove), U.S. Pat. No. 0,000,050 (Stove and Fireplace), U.S. Pat. No. 0,000,062 (Cook Stove), U.S. Pat. No. 0,000,071 (Parlor and Cooking Stove Combined), and U.S. Pat. No. 0,000,083 (Cooking Stove) are all patents which describe various models of cooking stoves which consume solid fuels such as wood or coal. These early stoves are modifications and improvements upon the "Franklin Stove" designed by Benjamin Franklin, which pre-dates the existence of the US Patent Office.

For many people in the developing world today the cost of a stove remains prohibitive, and low-tech three-stone stoves remain commonplace. Sadly, smoke and gas emissions from primitive stoves that burn wood, animal dung, or crop residue, leads to prevalent lung disease and respiratory illnesses in the developing world, largely to women and children who spend a significant amount of their time indoors. The World Health Organization estimates that more than 4 million people die each year from household air pollution generated by cooking with solid fuels in poorly ventilated spaces. (Household air pollution and health, WHO Fact sheet No. 292, February 2016) International initiatives such as Global Alliance for Clean Cookstoves are investing in innovation and education to bring affordable and safer cooking technologies to the developing world. However, many of these new technologies are based on fossil fuels which require heavy subsidies to low income households.

The fire triangle calls for fuel, oxygen, and an ignition source to have successful combustion. Solid natural fuels such as wood and biomass and wood pellets made from wood and paper byproducts are inexpensive, widely available, easily transportable, are inherently safe in both handling and storage, and can burn cleanly and efficiently under good combustion conditions, however often need a more combustible fuel to get them started. In biomass stoves, two types of solid biofuels are generally required: a low energy, low density, yet highly volatile organic substance such as a dried leaf, grass or thin tissue of some sort is utilized as a "starter," and a main fuel comprising a higher energy, higher density, but initially less volatile substance, such as a block of wood, tree branch, or a manufactured compressed wood/bio pellet. It is not until that higher energy substance reaches a high enough temperature that it is able to decompose and releases more volatile components locked inside its matrix, which can ultimately contribute to its more complete combustion provided there is adequate oxygen available to facilitate this, otherwise these are released as unburnt emissions.

Forced air stoves generally draw pressurized atmospheric air into the combustion chamber using a fan powered either by way of a battery, or an external source of electricity. The fan can blow high velocity, low volume jets of atmospheric air into the combustion chamber, which, when optimized, results in more complete combustion of the fuel. Some forced air stoves also have temperature regulators to control the fan speed, and thus the combustion temperature in the stove.

U.S. Pat. No. 5,105,797 to Gulutzen et al. describes a stove having a perforated semi-cylindrical combustion chamber having a valved air inlet which controls combustion air flow into a combustion chamber to a rate sufficient to maintain a high temperature within the chamber. Combustion air is drawn into the stove via an air intake and is forced through the combustion air duct by a fan.

Various other stove designs use preheated combustion air and have a bifurcated air supply to heat a secondary air stream while directing a primary air stream into the combustion chamber. In one example, U.S. Pat. No. 4,471,751 to Hottenroth discloses a stove having a combustion chamber with an integrated grate, wherein a primary air chamber directs air through the grate into the combustion chamber. A plurality of air passageways between a secondary air chamber and the combustion chamber allow air to flow within the secondary air chamber and be heated by heat conducted through the wall from the combustion chamber. Other designs such those described in U.S. Pat. Nos. 4,867,050 and 4,924,847 to Patenaude have a combustion chamber having an air metering plate or diffuser plate with a plurality of openings for promoting controlled combustion of a solid combustible material placed on top of the plate.

In any of the above-mentioned technologies the fire starting process generally involves lighting the first more volatile starter component in order to produce enough energy to ignite the second solid biofuel component where the majority of the potential heat energy resides. Often a supplementary fire starter such as naphtha, kerosene, propane, butane, paraffin-coated cardboard, or some other petroleum distillate is employed in order to accelerate or pre-ignite the main solid fuel. Unfortunately, this "pre-ignition sequence" introduces at least two unwelcome outcomes. In particular, soot is the copious amount of smoke resulting from partially combusted byproducts produced at preliminary ignition because the temperatures are not yet high enough for them to decompose further, or the amount of oxygen available to the combusting surface is insufficient, in order to completely combust all the carbonaceous matter. In addition, when a fire starter is utilized, it is generally from a non-renewable or out-of-cycle carbon source, such as a petroleum derivative.

Global efforts seek to address the world problem of the classic "three stone stove", which is the method by which nearly a third of humanity continues to cook their food to the detriment of their personal health as well as the climate health of the planet. What is required is a stove of a practical size and cost, which improves indoor air quality while using available or inexpensive biomass as a fuel source. In particular, there remains a need for a stove that provides high efficiency combustion using biomass.

In addition to personal and climate health, the third compelling reason for a biomass stove is an economic one. Currently, as well as for the foreseeable future and regardless of which stove technology is employed by the consumer, the cost of utilizing its supporting fuel soon exceeds the sunk capital cost of the stove hardware. By utilizing biomass fuel, the consumer enjoys between one and two orders of magnitude savings in fuel cost by comparison to utilizing electricity or petroleum derived fuel sources.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a clean, efficient and economical biomass stove. In an aspect there is provided a forced air stove comprising: a baseplate comprising a plurality of apertures; an air mixing chamber below the baseplate, fluidly connected to the plurality of apertures; an atmospheric air intake fluidly connected to the air mixing chamber; and an oxygen enriched air intake fluidly connected to the air mixing chamber, the oxygen enriched air intake connected to an oxygen enriched air source.

In an embodiment, the air stove further comprises a combustion chamber, the combustion chamber defined by a sidewall extending upward from the baseplate.

In another embodiment of the air stove, the combustion chamber extends at an angle of greater than 90° relative to the baseplate.

In another embodiment of the air stove, the baseplate comprises a steel plate.

In another embodiment of the air stove, the baseplate comprises a ceramic plate.

In another embodiment, the air stove further comprises a regulator at the oxygen enriched air intake to control the pressure of oxygen enriched air entering the air mixing chamber.

In another embodiment of the air stove, the atmospheric air intake further comprises a forced air regulator for pressurizing atmospheric air.

In another embodiment of the air stove, the forced air regulator is a fan.

In another embodiment of the air stove, the apertures in the baseplate are positioned at an angle to the baseplate.

In another embodiment of the air stove, the apertures in the baseplate are frustoconical in shape.

In another embodiment, the air stove further comprises an ignition device. In another embodiment, the ignition device is selected from an arc plasma device, a glow point plug, a piezoelectric igniter, and a friction ignition device.

In another aspect there is provided a method of burning solid fuel comprising: putting solid fuel onto a combustion surface; supplying oxygen enriched combustion air to the combustion surface; and combusting the solid fuel in the presence of the oxygen enriched combustion air.

In an embodiment, the method further comprises supplying the oxygen enriched combustion air to the combustion surface through a plurality of apertures in the combustion surface.

In another embodiment, the method further comprises mixing the oxygen enriched combustion air with atmospheric air to reduce the oxygen content of the combustion air.

In another embodiment of the method, the solid fuel comprises at least one of wood pellets, wood, ground nut shells, coconut husk, coffee shells, corn husks, corn cobs, oil palm shells, oil palm fruit bunches, dung, grass, bamboo, sugarcane, paper, plant waste, lignocellulosic biomass, and coal.

In another embodiment, the method further comprises supporting the solid fuel above the combustion surface.

In another aspect there is provided an air stove comprising: a combustion surface for supporting solid fuel for combustion; an oxygen enriched air intake fluidly connected to the combustion surface, the oxygen enriched air intake connected to an oxygen enriched air source.

In an embodiment of the air stove, the combustion surface comprises a plurality of apertures fluidly connected with the oxygen enriched air intake, wherein oxygen enriched air is directed through the apertures to the combustion surface.

In another embodiment, the air stove further comprises at least one regulator to regulate flow rate of oxygen enriched air to the combustion surface.

In another embodiment, the air stove further comprises an air mixing chamber fluidly connecting the combustion surface to the oxygen enriched air intake.

In another embodiment, the air stove further comprises an atmospheric air intake fluidly connected to the combustion surface.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
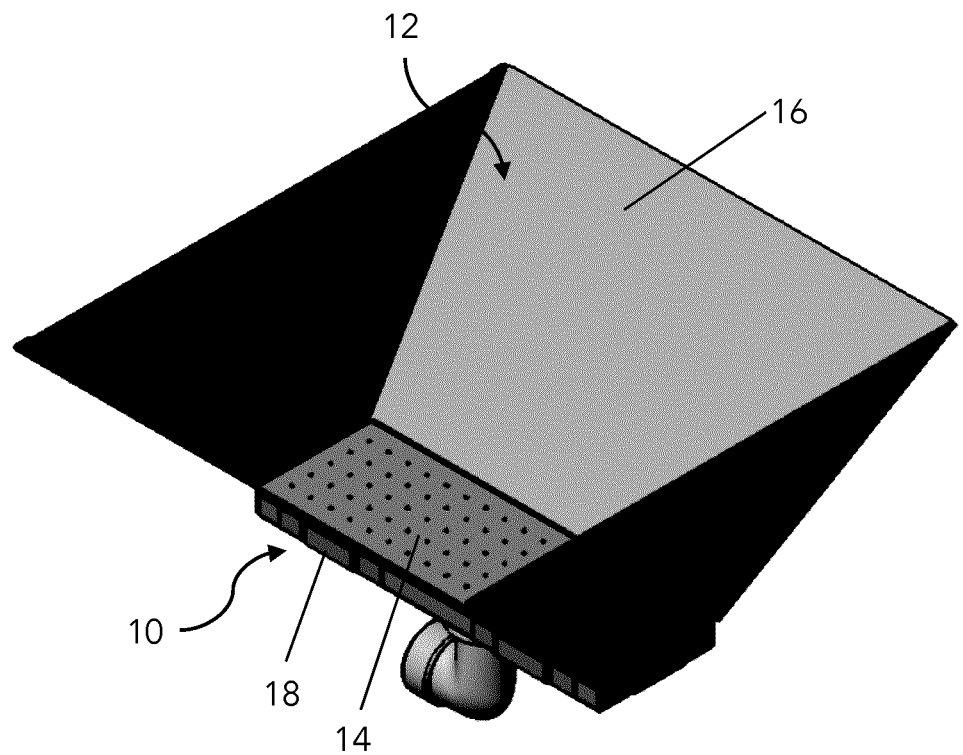
FIG. 1 is a perspective view of an air stove and combustion chamber according to the invention.

Unless defined otherwise, all technical and scientific terms used herein have the same meaning as commonly understood by one of ordinary skill in the art to which this invention belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "oxygen enriched air" refers to air that contains an above-atmospheric amount or pressure of oxygen gas. The percentage of oxygen gas in the atmosphere is approximately 21.3%. At high altitude, although the percentage of oxygen in the atmosphere is generally the same, the amount per volume of air changes due to overall reduced atmospheric pressure. The oxygen enriched air can be supplied in a pressurized gas canister or by means of a feed line where the feed source is a compressor incorporating polymeric membranes for the removal of a percentage of nitrogen gas from atmospheric air, thereby providing an oxygen enriched air source. Another method of producing "oxygen enriched air" is by compressing air in a chamber containing the natural mineral zeolite. The free nitrogen gas ($N_2$) within the compressed air will react with the zeolite mineral to form nitrogen compounds and therefor its percentage relative to the rest of the air will be reduced, which in turn increases the percentage of the other components of air, the majority of which is oxygen. While the higher the pressure, the more $N_2$ will be absorbed by the mineral, it is possible to produce a NITROX blend with an oxygen percentage as high as 35% at relatively low pressures. These pressures are around $1/10^{th}$ of the pressures otherwise utilized by diving compressors, and this in turn allows for far less expensive machinery to generate a low-oxygen blend of NITROX still suitable for many "combustion air" applications.

The term "combustion air" as used herein refers to the air supplied to the combustion surface or baseplate of the air stove to support combustion of the solid fuel. The combustion air may comprise atmospheric air or oxygen enriched air in any ratio or at any oxygen concentration at or above atmospheric oxygen concentrations. It is understood that depending on the location on earth, the concentration of oxygen in atmospheric air can vary widely.

The present invention is directed to an air stove that uses biomass fuel. The present stove enables oxygen enriched air to be used as a combustion air supply to encourage ignition of higher density biomass fuels, and to optimize combustion of biomass fuels. Incomplete combustion occurs in a combustion reaction when there is not enough oxygen to allow the fuel to react completely to produce carbon dioxide and water. Supplementing the air stove with oxygen gas to the combustion chamber reduces the formation of solid combustion by-products such as carbon particulate, soot, and smoke, and gaseous combustion by-products such as carbon monoxide.

Climate change resulting from our continued combustion of fossil fuels (also referred to as out-of-cycle carbon, which is carbon that has been out of the biological cycle for a long time) is now recognized as perhaps the most serious problem facing the world's inhabitants. When it comes to cooking food, whether we utilize propane, charcoal or electricity, we further contribute to this ever-increasing global dilemma, with the method of use only differing in quantity of emissions. The combustion system proposed herein allows for an efficient method of cooking food that utilizes in-cycle carbon, which is carbon that has been biologically sequestered as carbon dioxide from the atmosphere in a recent timescale.

Oxygen enriched air is injected into the stove device in order to provide an oxygen rich atmosphere within the combustion chamber of the device. An oxygen rich atmosphere is particularly useful at precise times of the stove operation, such as the critical pre-ignition start up phase as well as during the addition of new fuel. By supplying oxygen enriched air to the combustion reaction, the present air stove may provide a reduction in quantity of resultant un-burnt emissions (smoke), a shortening of the length of time required during the firing up process, and greater efficiency heat output.

NITROX is a gas mixture composed primarily of nitrogen and oxygen. Atmospheric air comprises about 78% nitrogen, 21% oxygen, and 1% other gases, primarily argon. In SCUBA diving, where reduced partial pressure of nitrogen is advantageous, preparations of NITROX having higher oxygen content are prepared by enriching atmospheric air with oxygen to provide a final oxygen content of above 21% and up to 50% oxygen. Because enriched oxygen NITROX has now become widely popular among both professional and recreational SCUBA divers, standards for safe preparation, storage and use of enriched oxygen air already exist. The present air stove utilizes these standards for commercially available oxygen enriched air mixes to provide a significantly greater percentage of oxygen than is normally available in the atmosphere around us, regardless of altitude.

The presently described air stove is capable of burning a variety of carbonaceous biomass fuels, such as wood, dung, crop wastes, leaves, and commercially prepared high-energy wood/bio pellets, while providing near full combustion efficiency, leaving minimal ash residue, and creating reduced soot compared to stoves whose combustion is fed solely with atmospheric air. The burning of high-density biomass pellets, which are currently a mass-produced and inexpensive fuel source, has been found to be an excellent fuel for use with the present stove and provides high efficiency, high temperatures, low ash residue, and low undesirable emissions with user-friendliness and long life. The construction of the air stove of the present invention also provides flexible fuel capacity by allowing various types of biomass to be burned by adjusting the oxygen level to control stove temperature and burn speed, no matter the biomass type.

Providing oxygen enriched air as the combustion air source eliminates the need for the introduction of a supplementary (usually petroleum based) non-renewable initial source fuel usually required at ignition. In particular, boosting the fire triangle by supplementing the combustion with more oxygen allows the main (high energy) solid biofuel to be ignited and consumed directly and earlier in the process, and enables the solid biofuel to be combusted in a very efficient manner. The air stove uses biomass as a solid fuel getting energy by burning organic matter. Burning biomass has been classed as a renewable energy source because the plant stocks sequester $CO_2$ directly from the atmosphere during their growth. Some examples of combustible material for use in the air stove include but are not limited to: wood pellets, wood, ground nut shells, coconut husk, coffee shells, corn husks and cobs, peat, oil palm shells and grape branch cuttings, dung, grass, bamboo, sugarcane leaves, paper, other plant waste, dried seaweed, and other lignocellulosic biomass. Other solid fuels may also be used, such as charcoal and biochar.

The present air stove design can be adapted for a wide variety of uses, including but not limited to an indoor cookstove, barbeque, barbeque insert, crematorium stove, boiler system for steam heated buildings, as well as other industrial plant heating systems. The combustion chamber which holds the solid biomass fuel to be burned with the present air stove can be of any shape required to contain the desired fuel and provide the desired function of the air stove.

In the case of a crematorium application, the air stove can of sufficient surface area such that a body or coffin can be accommodated on the baseplate, and the combustion chamber can be of a large enough size to accommodate the body on the baseplate and contain the combustion reaction.

The present air stove can also be combined with a variety of different devices to assist with use of the heat created by the stove. A variety of cooking surfaces can be adapted to be attached to the air stove at any location above the baseplate, while still providing sufficient space for fuel and combustion. Some examples of cooking surfaces can include a tripod or ring support for a cooking pot, grill plate, or cooking surfaces that can be used for frying or baking. Other cooking surfaces can include other pot stands, conduction surfaces, a three sided refractory box for baking, or any other cooking surface that would be known to the skilled person. The present air stove can also be encapsulated in a larger structure such as an oven, to provide an internally encapsulated heated space. Some examples include cremation ovens, furnaces, woodstoves, and the retrofit of oil or coal fueled steam boilers in buildings.

Turning now to the figures, FIG. 1 shows an embodiment of the enriched air stove 10 attached to a combustion chamber 12 with sidewalls 16. The optional combustion chamber 12 can be located above the baseplate to contain and control the solid material being combusted and direct the heat produced by the combustion. In the configuration shown combustion chamber 12 is defined by sidewalls 16 extending from the baseplate 14 of the air stove, however a variety of other configurations of the combustion chamber are conceivable. The combustion chamber 12 is adapted to receive and contain solid fuel for combustion and has a perforated baseplate 14 to support the solid combustion fuel. The sidewalls 16 as shown are comprised of plates of stainless steel, which can be held in place by a support structure located on the sides of the air mixing chamber 18. This configuration of the combustion chamber 12 radiates heat in an upward direction and towards a cooking surface or container. A combustion chamber 12 of this design can also be adapted to receive or support an open topped fire pot.

In the embodiment shown, the baseplate 14 is a stainless steel plate with spaced apertures, which act as diffusion holes to direct air from the air mixing chamber 18 into the combustion chamber 12, however a variety of configurations of the baseplate are possible. The baseplate 14 can be comprised, for example, of mild steel with a plurality of apertures in a variety of configurations, the apertures fluidly connected to air mixing chamber containing the mixed air. In other configurations, the baseplate 14 can be of any material able to withstand high temperatures, that has apertures to allow air to flow through from the air mixing chamber 18 through the baseplate 14, the apertures sized and capable of allowing passage of air through the baseplate. The apertures in the baseplate should be capable of allowing passage of air from the air mixing chamber into the combustion chamber, as well as capable of supporting the combusting solid fuel. In particular, the apertures in the baseplate should enable sufficient pressures to input combustion air into the combustion chamber to accomplish adequate combustion of fuel therein. In one example, baseplate 14 can be made of stainless steel plate with a plurality apertures in any desired shape, configuration, and size. Other materials can be used for the baseplate comprising sized to allow passage of combustion air, including but not limited to including a ceramic plate with apertures, alumina filter, zirconia filter, mullite filter, other heat stable solid material with apertures, or heat stable filter. Many of these filters are currently utilized as consumables in the foundry industry where they are employed as metal and slag filters during the pouring of castings.

In specific applications, a planned pattern of apertures in the baseplate can direct more air to some areas of the baseplate than others. In one example, in a crematorium application, the density of apertures in the baseplate can be greater in a body-shaped configuration to direct more combustion air to the area of the baseplate supporting the body to be burned. The body or coffin or other solid combustible fuel may also be suspended or supported above the baseplate so as not to block the apertures in the baseplate during combustion. This also provides space above the air supply to position the combustible fuel at the area of maximum heat intensity.

Figure 2:
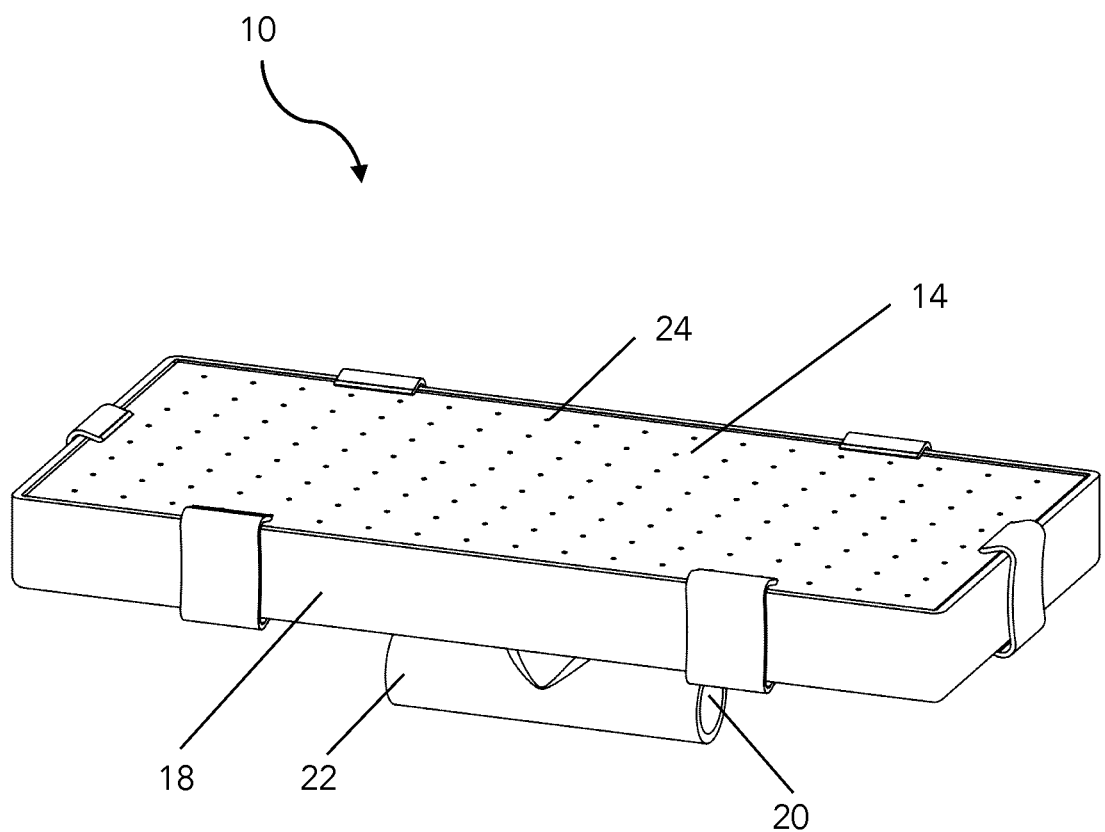
FIG. 2 is a perspective view of an air stove with baseplate and air mixing chamber.

FIG. 2 is a perspective view of an air stove 10 with baseplate 14 and air mixing chamber 18 below the baseplate 14. The air mixing chamber 18 is fluidly connected to ports for receiving atmospheric air as well as oxygen enriched air. Before and during combustion, air can be supplied to the air mixing chamber through an atmospheric air intake 20, oxygen enriched air intake 22, or combination thereof. In the case where both atmospheric air and oxygen enriched air are used to supply air to the air stove, the atmospheric air and oxygen enriched air are mixed either before reaching the air mixing chamber or in the air mixing chamber. In the embodiment shown in FIG. 2, the mixing of atmospheric air and oxygen enriched air occurs downstream the atmospheric air intake 20 and the oxygen enriched air intake 22 at a T-junction, however other configurations of intake ports would be clear to the skilled person. In one alternative configuration, the air mixing chamber may have two separate ports, preferably adjacent, one for each of the atmospheric air intake 20 and the oxygen enriched air intake 22, and mixing of the two air sources would occur entirely in the air mixing chamber. In another alternative embodiment, the atmospheric air intake 20 and the oxygen enriched air intake 22 may be combined farther upstream the air mixing chamber. Any acceptable fittings capable of fluidly connecting two air streams known to the skilled person may be used to join the air streams.

Figure 3:
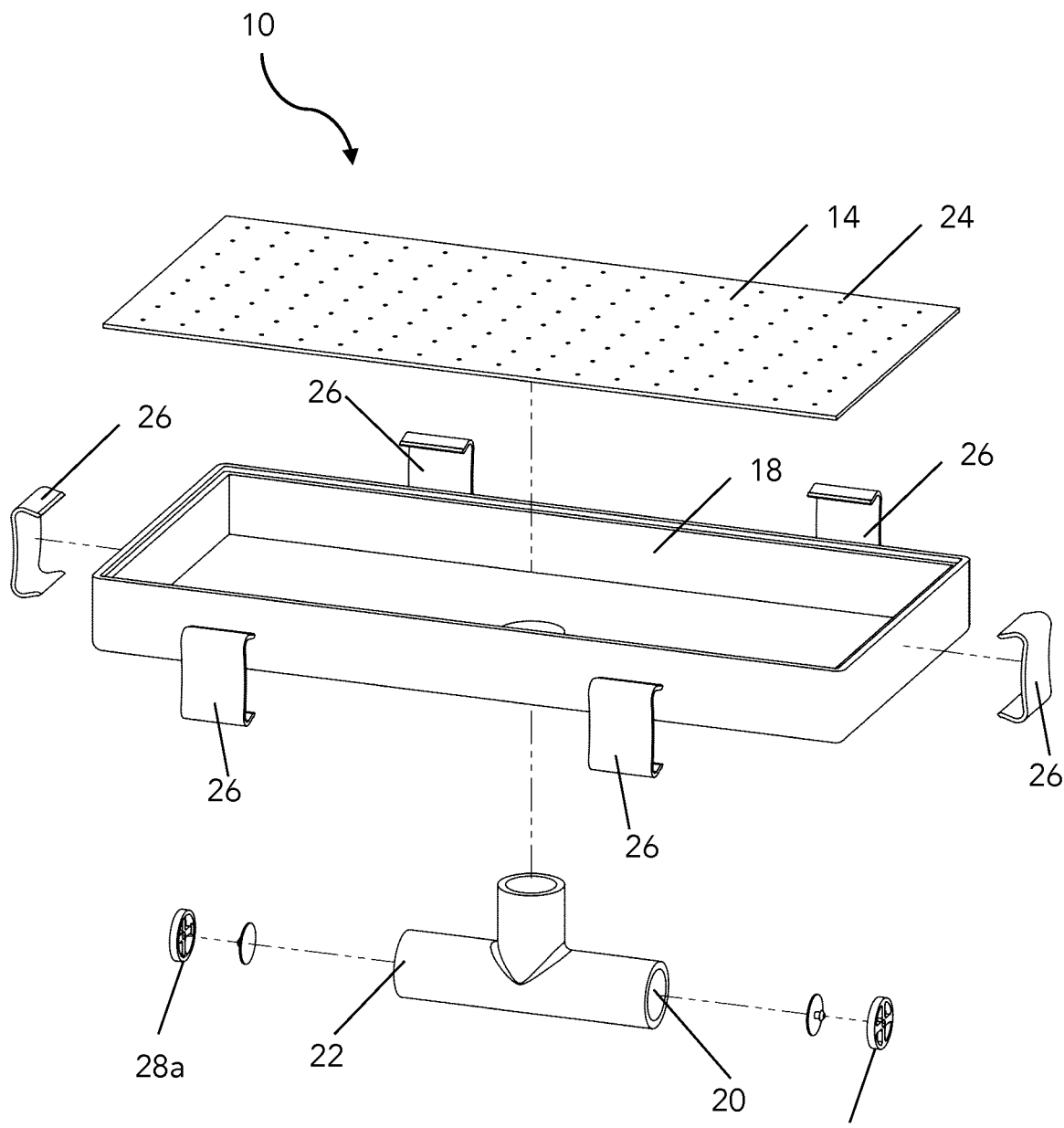
FIG. 3 is an exploded perspective view of an air stove.

FIG. 3 is an exploded perspective view of an air stove 10. The air mixing chamber 18 is located below and is fluidly connected to baseplate 14 to enable mixed air to pass from air mixing chamber 18 through the apertures 24 in the baseplate 14. Air mixing chamber 18 is substantially air tight to control the flow of air from the air supply ports through the apertures in the baseplate 14. When assembled as shown, baseplate 14 can be secured to the air mixing chamber 18 with a plurality of holding clips 26, although other methods of securing the baseplate to the air mixing chamber are also possible. In another alternative embodiment, the baseplate and air mixing chamber are manufactured in a single body, such as from stainless steel, and the air supply ports are connected and secured to the bottom of the air mixing chamber. In another alternative the bottom plate could be a casting with a ceramic filter as the baseplate lowered onto a gasket set inside the inner rim of that casting.

High efficiency combustion is achieved at the air stove through the controlled introduction of forced or pressurized air through the baseplate 14. Combustion air is supplied through atmospheric air intake 20 and oxygen enriched air intake 22. The velocity or pressure of air introduction to the combustion reaction can be variably selected to provide the desired heat and intensity combustion conditions by controlling the pressure of each air supply, optionally with additional air regulators 28a, 28b in one or both of the atmospheric air intake and oxygen enriched air intake ports. The air valves can be the same or different for each port. Other methods for controlling the air pressure in each of the air ports can be used, including a fan in the case of the atmospheric air supply, or pressure applied from a compressed air source in the case of the enriched oxygen air supply.

Combustion air pressure can be controlled by controlling the flowrate or pressure of forced atmospheric air, the enriched pressurized air, or both, through the baseplate. The ratio of atmospheric air to enriched pressurized air can be controlled, for example, by one or more regulators. The regulator may regulate the ratio of atmospheric air and oxygen enriched air in the combustion air supply. Using the one or more air regulators or other air supply control means, the pressure and ratio of atmospheric air to oxygen enriched air can be controlled. In one example, the amount of oxygen in the combustion air can be enriched at ignition, and tapered off as combustion of the solid fuel is well established such that the amount of oxygen in the atmospheric air under normal or increased pressure conditions can sustain the combustion.

The air supply regulators can be regulated by one or more mechanical valve such as a variable switch, regulator, adjustable nozzle, or slider with variable aperture size and downstream pressure, and can be configured to be controlled manually such as, for example, by sliding, pushing, or turning. Other air rate regulating means can be used, such as a baffle. and an oxygen rate regulator, such as a regulator valve, can regulate the rate at which oxygen and combustion inert gases are supplied to the nozzles. Although example air regulators 28a and 28b are shown as fitting into the T-joint, it is understood that air regulators can be placed at any location between the air supply and the air mixing chamber. For example, in the case of regulating enriched oxygen air, an air regulator can be positioned at any location between the source of the enriched oxygen air and the air mixing chamber.

The air supply regulators can also be electrically controlled, such as by a solenoid or servo, or other electronic or electrical mechanism for controlling the flow and/or pressure of atmospheric air and enriched oxygen air into the air mixing chamber. In an alternative embodiment, if at least one of the air supply regulators are electrically or electronically controlled, the air stove can be connected to a control unit or microcontroller to electronically control the air supply regulators. In one example, a controller can take a temperature reading at the combustion chamber via a sensor and adjust the amount and/or pressure of the combustion air supplied through the baseplate. An electronic control circuit can also be used to regulate the flow rate through the fuel, air, and oxygen regulating means in accordance with the temperature sensed by a temperature sensor, or other temperature or combustion rate selection input. In addition, the array or sensors and controls can be expanded to include a feedback loop whereby exhaust particulate emissions are measured, and the introduction of oxygen enriched air can be applied whenever these particulate emissions exceed a predetermined amount in order that the combustion device comply with any governmental regulatory emissions standards in force within its geographic area of operation.

The pressure or velocity of atmospheric air may also be controlled using a rotating forced air device, such as, for example, a fan or turbine. The fan or turbine may comprise at least one fixed speed and/or at least one variable speed fan, and may further comprise at least one variable speed electric fan. Optionally, the regulator further comprises a potentiometer for regulating the speed of the fan. The fan may also comprise at least one blower. The fan speed or pressure of atmospheric air into the atmospheric air intake can be controlled manually, such as from a dial, switch, optionally with speed and/or pressure set settings, with a stepped or variable speed electrical device. Electrical control from a control unit or microcontroller may also be connected to the fan. One or more mechanical or electrical switches for controlling air flow rate and the level of oxygen enrichment mixed air injection of air containing a higher percentage of oxygen than normally found in the ambient atmosphere can also be provided for operation by the air stove operator. Both air supply regulators for the atmospheric air intake and the oxygen enriched air intake may also be configured to be operable by a single lever, switch, or mechanical or electrical device to simplify operation of air control to the air stove user.

The pressure and/or flow-rate of each of the atmospheric air and enriched oxygen air can be controlled in an automatic way, by means of a program or software, the speed of said fan, and consequently said atmospheric air flow of forced air, aimed at feeding the combustion of the biomass with an aim to providing complete combustion. The combustion air flow rate and ratio of atmospheric air and enriched oxygen air can be determined as a function of the temperature of the combustion flame or temperature above the baseplate, as detected by a temperature sensor. During the final stage of the combustion cycle of the biomass, and therefore its carbonization, combustion air ratio and rate can be adjusted to cause the complete combustion of the biomass load, that is without leaving at the end of its combustion cycle any carbonaceous residue on the baseplate of the air stove.

Figure 4:
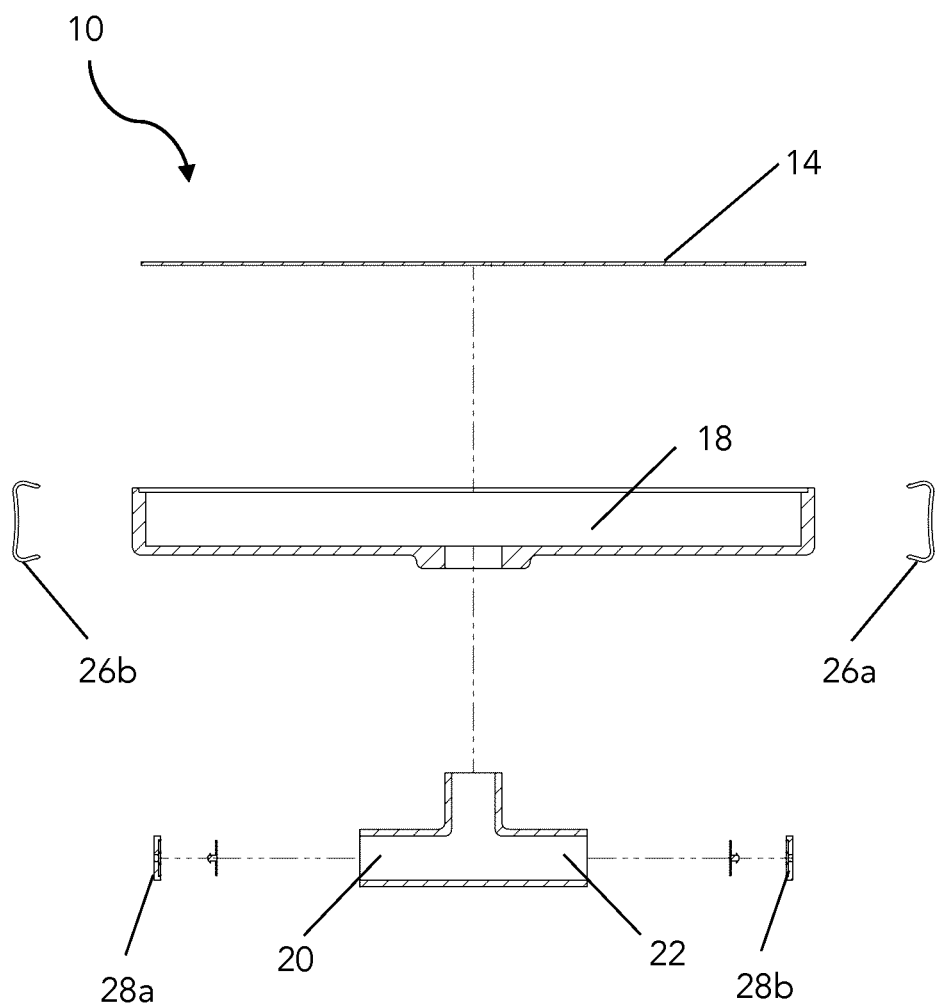
FIG. 4 is an exploded side view of an air stove.

FIG. 4 is an exploded side view of an air stove 10. As shown, baseplate 14 is positioned on the top of air mixing chamber 18 such that it forms a substantially air tight seal to encourage combustion air to flow through the apertures in the baseplate. In the configuration shown, holding clips 26a, 26b secure baseplate 14 to air mixing chamber 18. Other joining devices can also be used, such as, for example, screws, bolts, pressure or biasing tabs, guide channels or devices. More permanent attachment means can also be used to secure the baseplate to the air mixing chamber, such as, for example, press fittings, employing a gasket, soldering, and welding. Combustion air is supplied to the air mixing chamber 18 by atmospheric air intake 20 and oxygen enriched air intake 22. Air regulators 28a and 28b regulate the amount of atmospheric air and oxygen enriched air through the atmospheric air intake 20 and oxygen enriched air intake 22, respectively.

Figure 5:
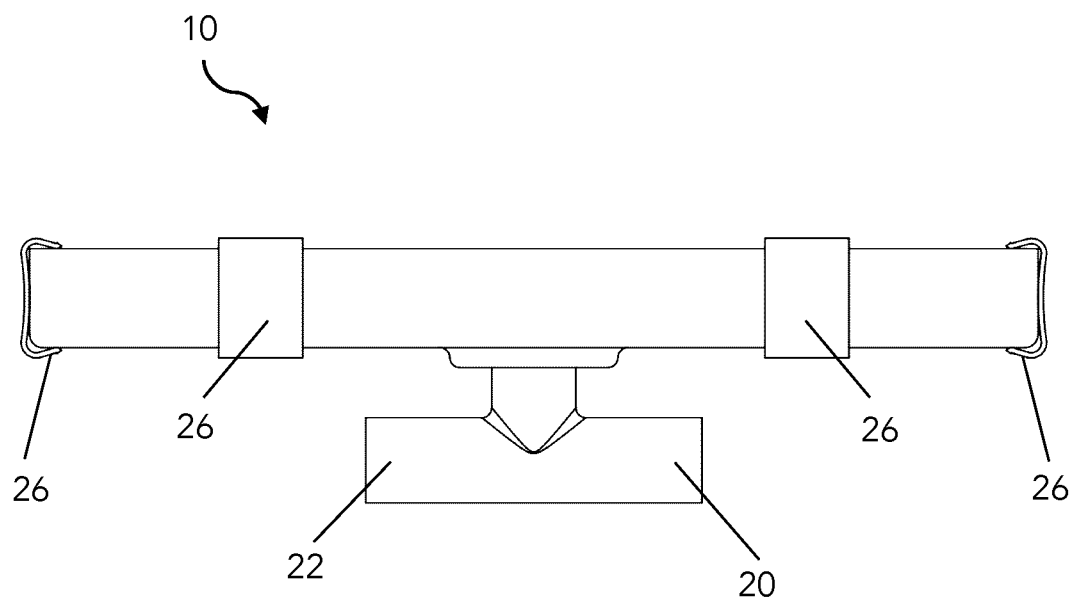
FIG. 5 is a side view of an air stove.

FIG. 5 is a side view of an air stove 10 having atmospheric air intake 20 and oxygen enriched air intake 22. A plurality of holding clips 26 secure the air stove components together.

Figure 6:
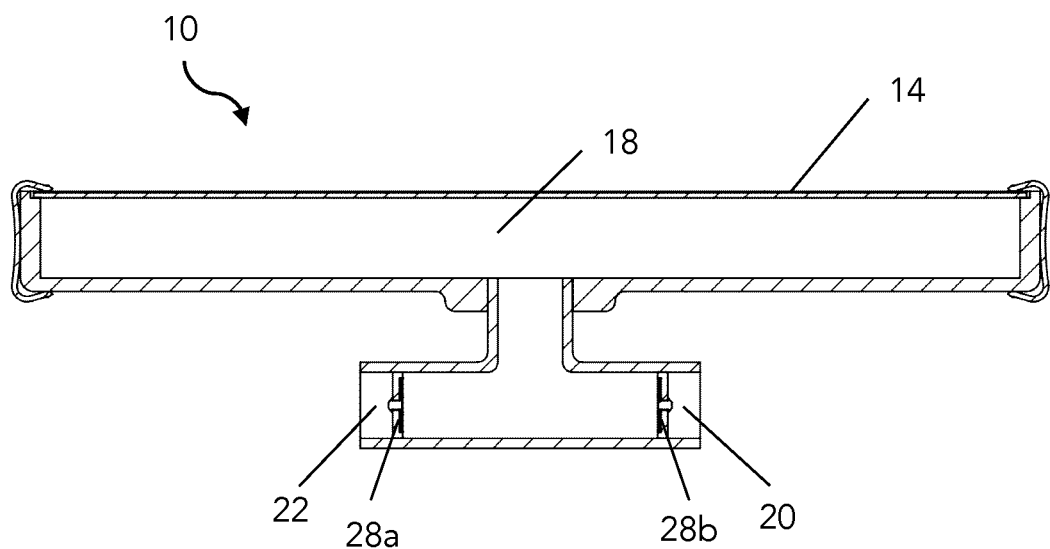
FIG. 6 is a side cross-sectional view of an air stove.
Figure 7:
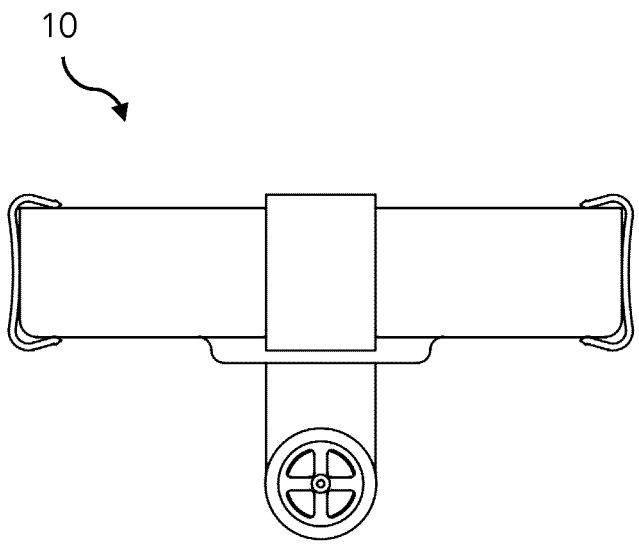
FIG. 7 is a side view of an air stove.

FIG. 6 is a side cross-sectional view of an air stove 10 with combustion surface baseplate 14 and air mixing chamber 18. Atmospheric air intake 20 and oxygen enriched air intake 22 are shown with additional air regulators 28a, 28b FIG. 7 is a side view of an air stove 10 showing one of the air intakes with an embedded regulator.

Figure 8:
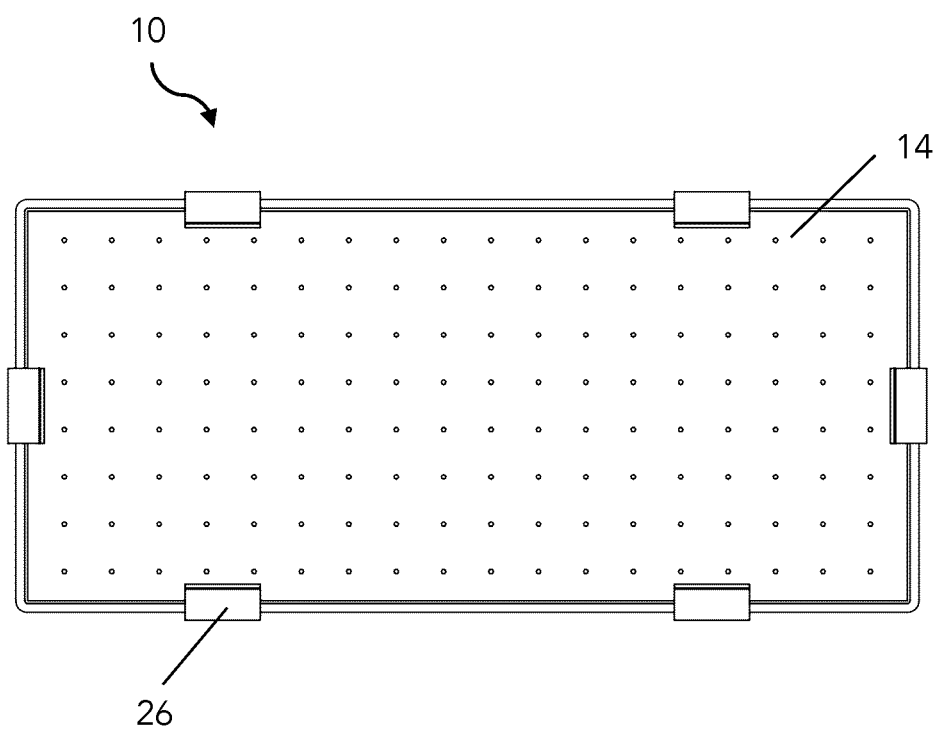
FIG. 8 is a top view of an air stove.

FIG. 8 is a top view of an air stove 10 with a perforated baseplate 14 and holding clips 26 securing the baseplate to an air stove body.

Figure 9A:
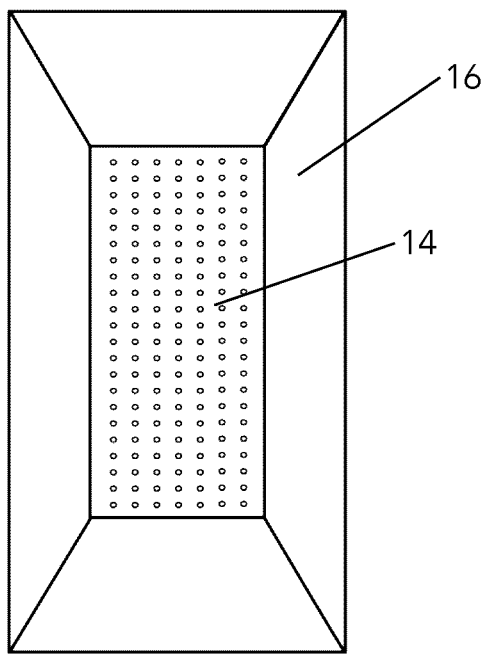
FIGS. 9A-9D are top views of different configurations of the air stove and combustion chamber.
Figure 9B:
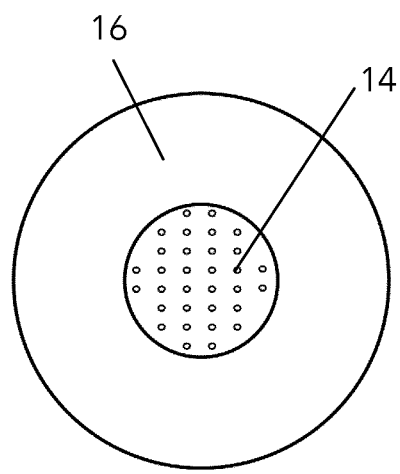
Figure 9C:
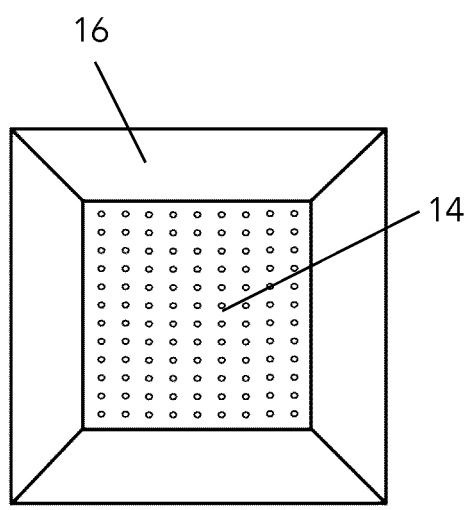
Figure 9D:
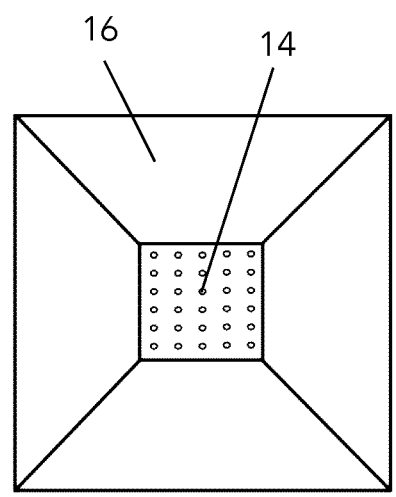

FIGS. 9A-9D are top views of different configurations of the air stove and combustion chamber. In FIG. 9A, the combustion chamber is an inverted rectangular pyramid with a rectangular shaped combustion surface. In another alternative the combustion chamber can have a conical shape with a single conical sidewall and a circular combustion surface as shown in FIG. 9B. The combustion surface can be of any sizes sufficient to support the solid fuel during combustion. In FIGS. 9C and 9D, the combustion chamber is shown an inverted square pyramid with a square shaped combustion surface. Other alternatives with a smaller baseplate and rectangular baseplate and combustion chamber are possible according to the function of the air stove. Other design alternatives can include variants with varying sidewall angle relative to the baseplate. In another alternative, the combustion surface or baseplate can have any shape, and the air stove can be devoid of sidewalls.

Figure 10A:
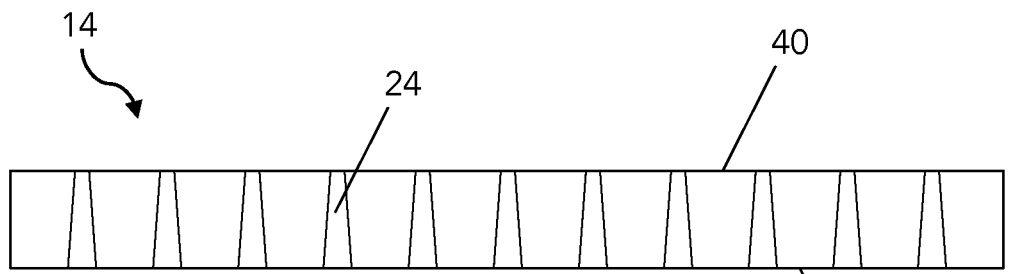
FIGS. 10A-10C are side cross-sectional views of variations of the baseplate.
Figure 10B:
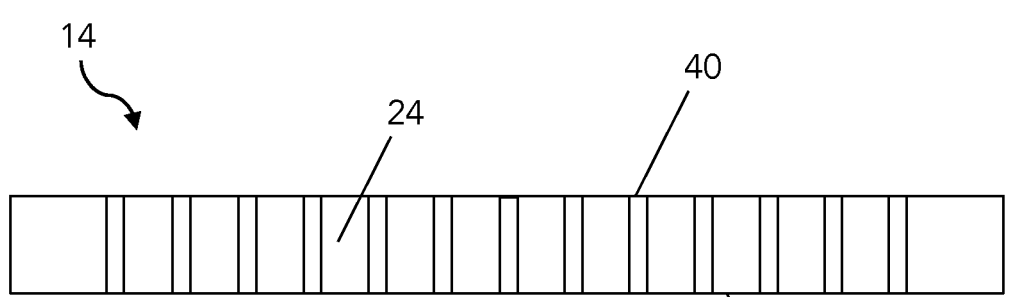
Figure 10C:
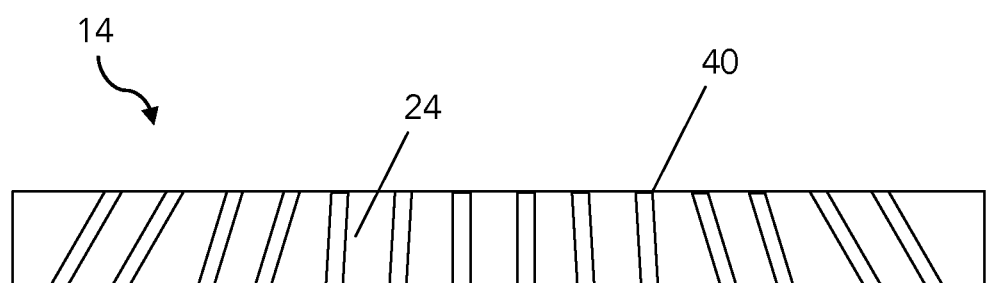

FIGS. 10A and 10B are side cross-sectional views of variations of the baseplate. In the embodiment shown in FIG. 10A, the frustoconical apertures in the baseplate have the narrow end at the top of the combustion surface of the baseplate 40 to increase the pressure of combustion air pressure at the combustion surface. In this way the air can be accelerated at the end of its journey through the baseplate to enhance burning above the combustion surface. In the embodiment shown in FIG. 10B, the apertures in the baseplate have a constant diameter across the baseplate 42. If the baseplate were concave or the apertures drilled at an angle, this feature could also serve to control/confine the area and flame height of the fire. In another configuration shown in FIG. 10C, the apertures in the baseplate can also be positioned at an angle to the surface of the baseplate to confine and/or intensify heat in a particular location on or above the baseplate and/or to control flame height.

Figure 11:
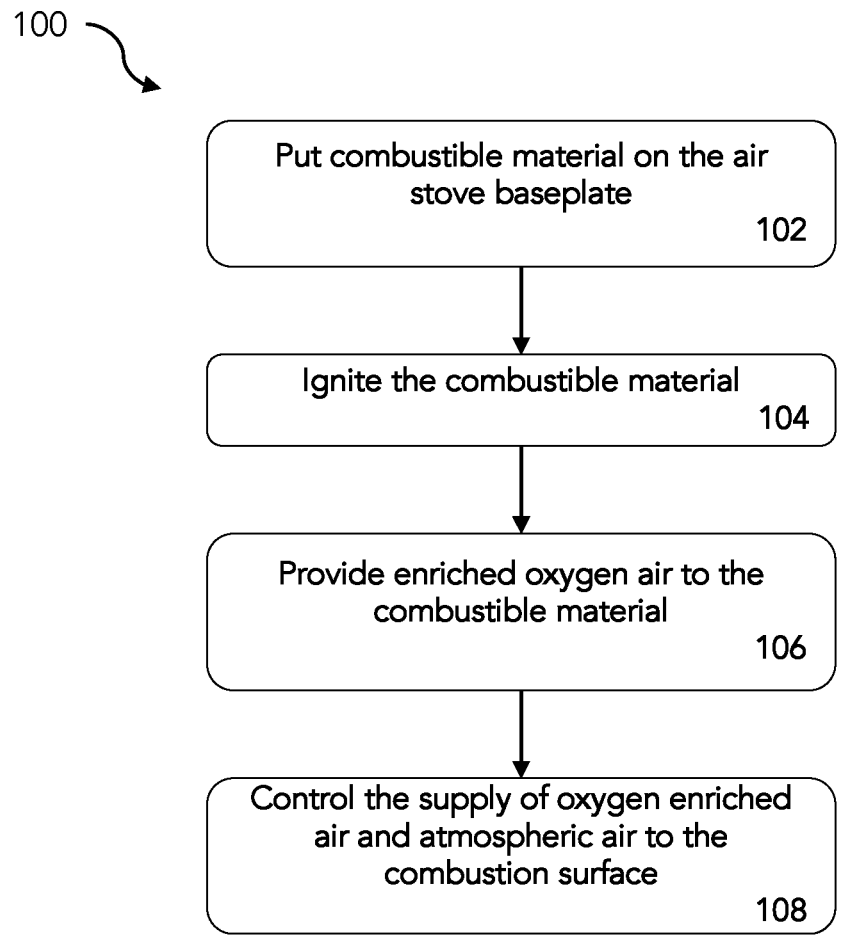
FIG. 11 is a flowchart of a combustion sequence using the air stove.

FIG. 11 is a flowchart of a combustion sequence 100 using the air stove. Solid fuel or combustible material is placed on the baseplate 102. The combustible material is then ignited 104. Enriched oxygen air is provided to the combustible material 106 either right before or during ignition or both to enhance the ignition process. The supply of oxygen is then controlled by controlling the flow of oxygen enriched air and atmospheric air to the combustion chamber 108.

Figure 12:
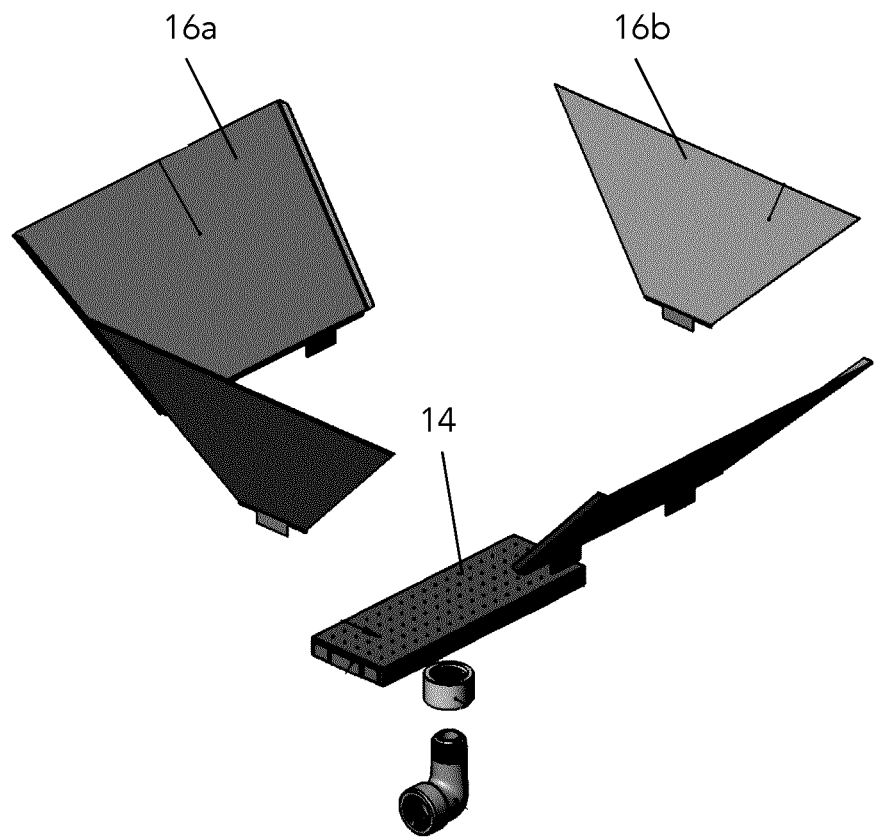
FIG. 12 is an exploded view of a disassembled air stove.

FIG. 12 is an exploded view of a disassembled air stove. The air stove can be constructed in a variety of different ways. In one embodiment, the combustion chamber can be attached to the baseplate top of the diffusion box by simple compression/slide over fit as the combustion area is open on top. The components shown in the exploded view lend themselves to the possibility of an "easy assemble kit" which can be flat-packed and shipped economically and can be of any dimensions for the specific application.

Other features can be added to the air stove to provide additional functionality according to the stove use. In an example where the air stove is used in a dwelling or house in place of a three stone stove or as a portable travel or camping stove, supporting means such as three or more legs can provide compact, light, and adjustable means to support the stove above the ground. Such a supporting mechanism can be attached or detachable from the air stove. Other external features may further include three or more supports for supporting a cooking pot, pan or grill can also be adapted to the stove.

A variety of liners or permanent or semi-permanent supporting structures and safety shields can be further used to insulate the stove, improving efficiency and providing protection from potential burn. In one case, a ceramic liner can be adapted to fit around the outside of a combustion chamber to support and insulate the air stove. More permanent structures may also be built for in-home cooking such as fireplaces, or brick or cinderblock stove encasements, optionally including one or more chimney, vent, or enclosed cooking space such as an oven. Other external structure may be provided to direct heat from the stove, such as additional insulators and heat reflectors. The present stove can be incorporated with additional insulation and/or encapsulation to provide a more sturdy, heavy, or permanent appliance. Optional encapsulation can include one or more of metal, ceramic, or other materials, which can serve to insulate, refract, stabilize, and/or provide additional safety or efficiency features to the stove. The stove can also be provided as a retrofit kit to retrofit existing clamshell barbeques.

Other optional additions to the stove can include but are not limited to one or more wired battery with energy storage, plasma injector for assisting with ignition, and control system optional gauges, wherein the control system can power one or more motors, valves, solenoids, external hookups, lights, and charger ports, and retractable covers or shields. The stove can further comprise an integrated ignition device such as, for example, an arc plasma device, glow point plug, piezoelectric igniter, or friction ignition device. Although the presently described stove is efficient at creating heat energy, it would be understood by a person skilled in the art that the heat energy generated may be used for a wide variety of applications. Some applications may include but are not limited to: cooking; heating an indoor or outdoor space; powering an industrial process, and generating electricity. A variety of systems for thermoelectrical generation are known and the present stove may also be adapted to fit any of these. The stove may be further connected to a solar panel through a controller/charger circuit in order to facilitate forced air into the combustion chamber at an adjustable rate as well as to divert electrical energy into storage for future use when light may not be available as a source of photons for the panel. Additionally, a panel or cover may be attached to the stove in order to make the stove portable and transportable. This addition of this feature assures energy independence for the device and enhances its portability.

Figure 13:
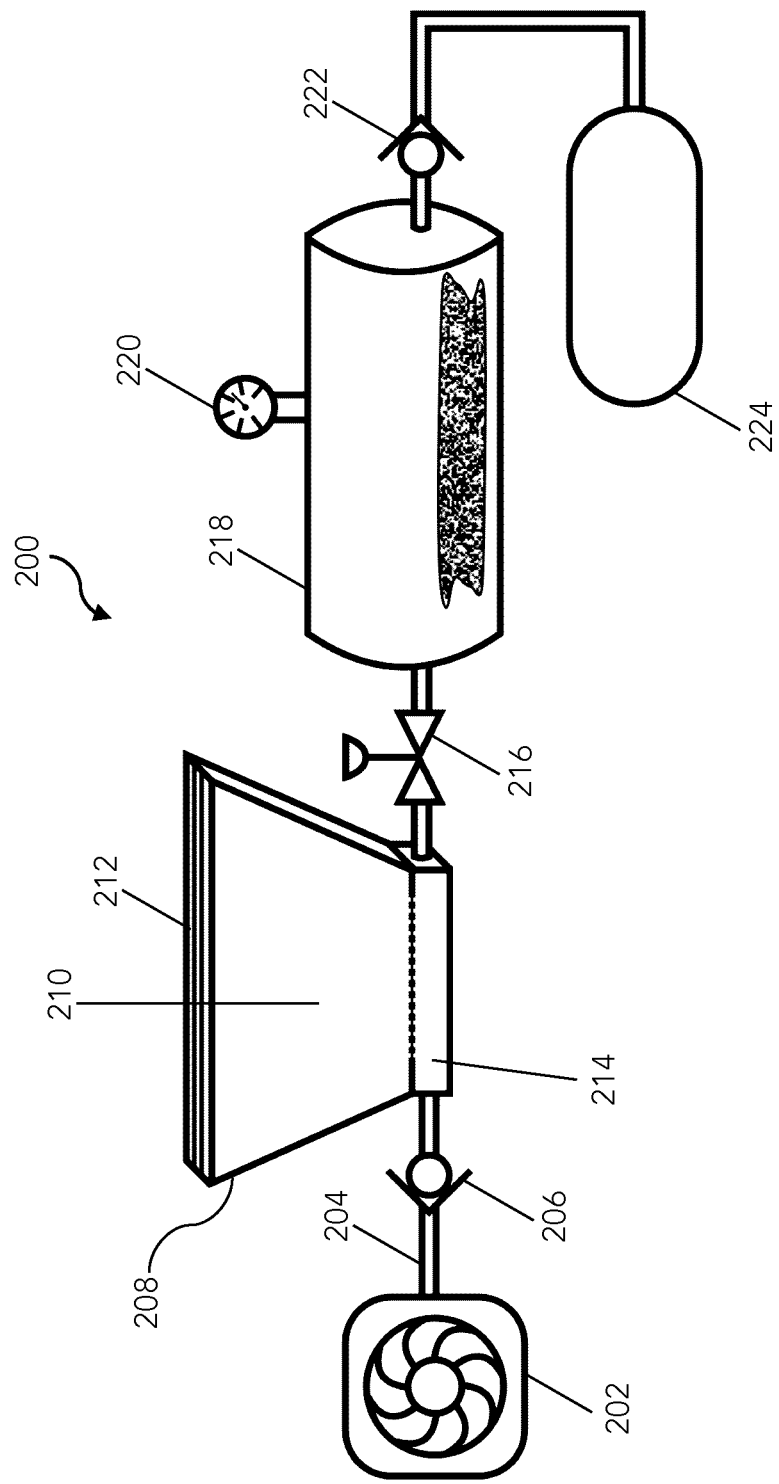
FIG. 13 is a diagram of system comprising an air stove.

FIG. 13 is a diagram of system 200 comprising an air stove with air and mechanical components. Blower motor 202 blows ambient air via air hose 204 and one way valve 206 into the air stove 208. In this embodiment, air is directed from valve 206 directly into the air stove manifold 214, although this may also be done with an optional t-junction manifold similar to that shown in FIG. 3. Air stove 208 comprises a combustion chamber 210 and grill surface 212. Control valve 216 connects a small DC compressor 224 to the air stove to supply air to the air stove 208 optionally through one way valve 222 and air chamber 218. Air chamber 218 optionally comprises a material that absorbs nitrogen gas ($N_2$) to enrich the air with oxygen. An example of a substance capable of absorbing or reacting with nitrogen gas ($N_2$) is zeolite molecular sieves. Air chamber 218 also has optional pressure gauge 220. Use of zeolite-treated ambient air has been found to be able to enrich the air supply to the stove to a gas comprising 30-32% oxygen, which is be sufficient to improve combustion efficiency in the air stove. Other small oxygen concentrators or nitrogen scrubbers can be used which provide gas to the air stove with higher than ambient levels of oxygen.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. An enriched air stove comprising:
a baseplate comprising a plurality of apertures;
a combustion chamber for supporting a solid fuel on the baseplate, the combustion chamber defined by one or more sidewalls extending upward from the baseplate, at least one of the one or more sidewalls extending at an angle of greater than 90° relative to the baseplate to radiate heat in an upward direction;
a temperature sensor for sensing temperature above the baseplate;
an air mixing chamber below the baseplate, the air mixing chamber fluidly connected to the combustion chamber through the plurality of apertures in the baseplate, the air mixing chamber directing air through the plurality of apertures in the baseplate to the combustion chamber;
an atmospheric air intake fluidly connected to the air mixing chamber comprising an atmospheric air regulator to control a flow rate of atmospheric air entering the air mixing chamber, the atmospheric air intake comprising a blower;
an oxygen enriched air intake fluidly connected to the air mixing chamber, the oxygen enriched air intake connected to an oxygen enriched air source and an oxygen enriched air regulator, the oxygen enriched air source comprising a gas mixture composed primarily of nitrogen and oxygen with an oxygen content of above 21% and up to 50% by volume; and
a controller connected to the temperature sensor and the oxygen enriched air regulator to control the oxygen enriched air regulator and the atmospheric air regulator to adjust the flow rate of oxygen enriched air and atmospheric air to the air mixing chamber, wherein the controller adjusts the flow rate of oxygen enriched air and atmospheric air entering the air mixing chamber based on the temperature above the baseplate.

2. The air stove of claim 1, wherein the combustion chamber has an inverted rectangular pyramid shape, conical shape, or inverted square pyramid shape.

3. The air stove of claim 1, wherein all of the sidewalls of the combustion chamber extend at an angle of greater than 90° relative to the baseplate.

4. The air stove of claim 1, wherein the baseplate comprises a steel plate.

5. The air stove of claim 1, wherein the baseplate comprises one or more of a ceramic plate, an alumina filter, a zirconia filter, and a mullite filter.

6. The air stove of claim 1, wherein the apertures in the baseplate are positioned at an angle to relative to a surface of the baseplate.

7. The air stove of claim 1, wherein the apertures in the baseplate are frustoconical in shape.

8. The air stove of claim 1, further comprising an ignition device.

9. The air stove of claim 8, wherein the ignition device is selected from an arc plasma device, a glow point plug, a piezoelectric igniter, and a friction ignition device.

10. A method of burning solid fuel comprising:
putting solid fuel into a combustion chamber, the combustion chamber defined by a combustion surface comprising a baseplate with a plurality of apertures and one or more sidewalls extending upward from the baseplate, at least one of the one or more sidewalls extending at an angle of greater than 90° relative to the baseplate;
igniting the solid fuel in the combustion chamber;
supplying oxygen enriched air from an oxygen enriched air source through a enriched air regulator at an enriched oxygen intake and supplying atmospheric air through an atmospheric air regulator at an atmospheric air intake to an air mixing chamber below the baseplate to provide oxygen enriched combustion air, the air mixing chamber fluidly connected to the combustion chamber through the plurality of apertures in baseplate of the combustion surface, the oxygen enriched air comprising a gas mixture of primarily of nitrogen and oxygen and having an oxygen content of above 21% and up to 50% by volume;
combusting the solid fuel in the presence of the oxygen enriched combustion air;
measuring a temperature above the combustion surface during combustion; and
during combustion, controlling the oxygen enriched air regulator at the enriched oxygen intake to adjust a flow rate of oxygen enriched air to the air mixing chamber and controlling an atmospheric air regulator to adjust a flow rate of atmospheric air to based on the measured temperature above the combustion surface.

11. The method of claim 10, wherein the solid fuel comprises at least one of wood pellets, wood, ground nut shells, coconut husk, coffee shells, corn husks, corn cobs, oil palm shells, oil palm fruit bunches, dung, grass, bamboo, sugarcane, paper, plant waste, lignocellulosic biomass, and coal.

12. The method of claim 10, further comprising supporting the solid fuel above the combustion surface.

13. The air stove of claim 1, wherein the air stove is in an oven, cookstove, barbeque, cremation oven, furnace, woodstove, or steam boiler.

14. The air stove of claim 1, wherein the controller comprises a microcontroller.

15. The method of claim 10, wherein igniting the solid fuel uses an arc plasma device, a glow point plug, a piezoelectric igniter, or a friction ignition device.

16. The air stove of claim 1, wherein the combustion surface comprises one or more of a steel plate, a ceramic plate, an alumina filter, a zirconia filter, and a mullite filter.

17. The air stove of claim 1, wherein the oxygen enriched air source comprises one or more of air from a pressurized cannister of commercially available NITROX, zeolite-treated ambient air, and oxygen enriched air from a compressor incorporating a polymeric membrane.

18. The method of claim 10, wherein the oxygen enriched air source comprises one or more of air from a pressurized cannister of commercially available NITROX, zeolite-treated ambient air, and oxygen enriched air from a compressor incorporating a polymeric membrane.

* * * * *